Nov. 12, 1968   B. G. GARCIA, JR   3,410,015
FISHING ROD HOLDER AND HOOK SETTING DEVICE
Filed Feb. 14, 1966   2 Sheets-Sheet 1

INVENTOR.
BENARDO G. GARCIA, JR.
BY
Warren, Brosler, Cypher and Anglim
ATTORNEYS Nov. 12, 1968   B. G. GARCIA, JR   3,410,015
FISHING ROD HOLDER AND HOOK SETTING DEVICE
Filed Feb. 14, 1966   2 Sheets-Sheet 2

INVENTOR.
BENARDO G. GARCIA, JR.
BY
Warren, Brosler, Cypher and Anglim
ATTORNEYS

United States Patent Office 3,410,015
Patented Nov. 12, 1968

3,410,015
FISHING ROD HOLDER AND HOOK SETTING DEVICE
Benardo G. Garcia, Jr., 1520 C St., Antioch, Calif. 94509
Filed Feb. 14, 1966, Ser. No. 527,286
2 Claims. (Cl. 43—15)

ABSTRACT OF THE DISCLOSURE

A fish rod holder and hook setting device having a pivotally mounted V-shaped holder for the fish rod. The holder is adjustably clamped at one end to a base for selecting the amount of pull necessary for a fish to exert upon the fishing line to move the holder in one direction. This movement of the holder sets off a spring mounted impact means operating to move the holder in an opposite direction so as to snap the holder and line, thereby setting the hook in the mouth of the fish.

---

The present invention relates to fishing rod holders and hook setting devices; particularly, those actuated by pole movement.

An object of the invention is to provide a new and improved device for holding a fishing pole which will automatically set a hook in a fish's mouth.

Another object is to provide a device which is easily mounted and set in the ready position.

Still another object is to provide a device which will enhance the sport of playing the fish by hooking a greater number of fish in the mouth rather than the throat which causes the fish to maneuver less.

A further object is to provide a short stroke device to prevent tearing the fish's mouth if it is lightly hooked in the soft part of the fish's mouth.

A still further object is to provide a device which will fit essentially all poles and which can be easily and securely mounted on a rigid structure such as the side of a boat or dock railing.

Another object is to provide a device which may be adjusted to respond in the desired manner while fishing under various natural conditions such as tides, currents, boat movements, heavy winds, heavy surf, etc.

An even further object is to provide a lightweight, inexpensive, long-lasting, rugged device in which the moving parts are protected.

Still another object is to provide a device which cannot harm the fisherman even if accidently tripped.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

Referring to said drawings.

Figures 1, 3, 4, 7:
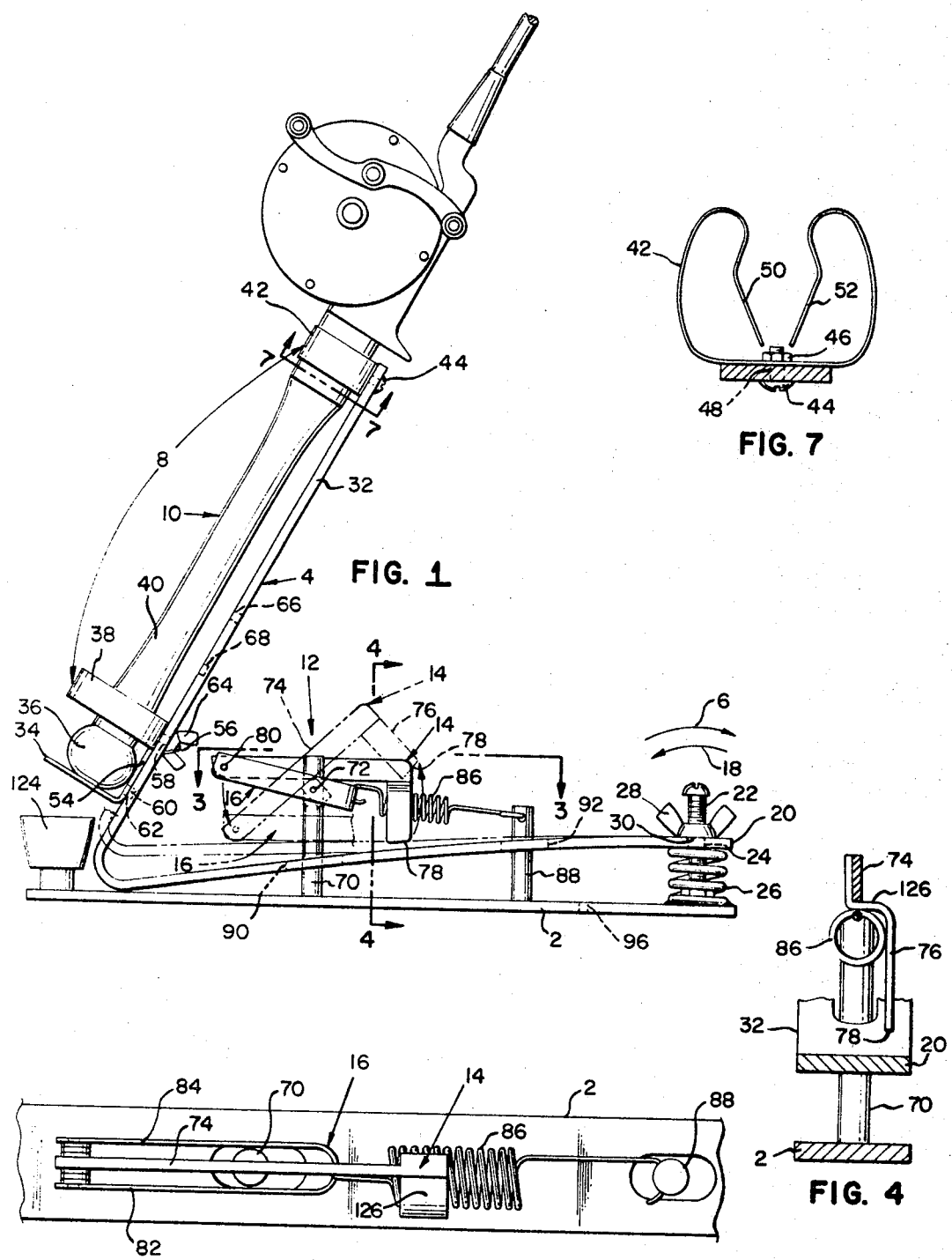
FIGURE 1 is a side elevation view of the present invention holding a fishing rod and reel; some moving parts being shown in phantom line.
FIGURE 3 is a partial top plan view of the device shown in FIGURE 1 taken substantially along the line 3—3.
FIGURE 4 is an enlarged cross-section of a portion of the device shown in FIGURE 1 taken substantially along the line 4—4.
FIGURE 7 is an enlarged cross-section view of a portion of the device shown in FIGURE 1 taken substantially along the line 7—7.

The fishing rod holder and hook setting device of the present invention consists briefly of a base 2; a rod holder member 4 mounted for pivotal movement on the base in a first direction indicated by arrow 6 and including first means 8 adapted for receiving a fishing pole 10; an impact means 12 mounted on the base including second means 14 selectively engageable by the rod holder member on a predetermined movement of said rod holder member and including striking means 16 movable against the rod holder member with impact force upon a predetermined movement of the second means 14 and thereby rapidly moving the rod holder member in a second direction indicated by arrow 18 opposite to the first direction for setting a hook in the mouth of a fish.

Base 2 is an elongated member which is preferably made of metal but may be made of any other material affording a base for attaching other parts of the device. The base as well as other parts of the device are preferably made of non-rusting rugged materials.

The rod holder member 4 is here constructed in a V-shape having one end 20 pivotally mounted on the base. End 20 is mounted on the base by means of a threaded stud 22 mounted uprightly on base 2 and through an opening 24 formed in end 20. A compression spring 26 is interposed between the base 2 and end 20 and an adjustable means 28 here consisting of a wing nut is threadably mounted on stud 22 and clamps end 20 against spring 26. Wing nut 28 has a sufficiently broad base 30 and the diameter of the spring 26 is such that upon clamping down of the wing nut 28 rotation of the rod holder member 4 will be impeded. End 20 of the rod holder member has sufficient rigidity so that a pivoting force from the rod 10 is translated to a compression force on spring 26.

The other leg of the V-shaped rod holder mounts the fishing rod in a first means 8 which consists of a butt stop 34 limiting the travel of the butt 36 of the fishing pole, a ring 38 preventing lateral movement of the handle 40 of the pole and a spring clamp 42 releasably holding the other end of the handle of the pole. Clamp 42 may be demountedly fastened to the rod holder by a threaded bolt 44 and nut 46 so that it can be attached at different openings 48 formed in the rod holder member. The clamp here shown consists of a single piece of flat metal shaped so that ends 50 and 52 spring apart when the rod is forced between the ends thereby clampingly holding the rod. The butt stop 34 and ring 38 are here joined by a rigid member 54. A threaded stud 56 is attached to ring 38 and is inserted through an opening 58 in the rod holder. A stub shaft 60 attached to rigid member 54 is matingly received in a bore 62 formed in the top surface of the rod holder member. Wing nut 64 is threadedly mounted on stub shaft 56 and may be removed for removing the ring and butt stop to auxiliary opening 66 and stub shaft 60 to auxiliary bore 68.

As can be seen, the fishing rod is detachably mounted in the first means 8 so as to translate the force exerted by the fish through the line upon the pole to the V-shaped rod holder member. The ease with which the rod holder member pivots about the threaded shaft 22 depends upon the strength of spring 26 and the amount of clamping force exerted by wing nut 28. Compression spring 26 is preferably a one inch by one inch 10 gauge, 111 pound load spring.

The impact means 12 is mounted on an upright member 70 at pivot point 72. The part pivoted at 72 here consists of an elongated member 74. Second means 14 is connected to one end of member 74 and has an elongated offset foot 76 connected thereto. The end 78 of offset foot 76 comes in contact with end 20 of the V-shaped rod holder member and is moved thereby. The other end of the elongated member 74 is pivotally connected to striking means 16 at pivot point 80. The striking means 16 here is shown as a yoke member having legs 82 and 84. The other end of the yoke member 16 is attached to a spring 86 which is fixedly attached to upright member 88. Spring 86 for normal use may be a 2½ inch by 7/16 inch spring developing 25 to 27 pounds of tension. An opening 90 in rod end 20 permits the insertion of upright member 70 therethrough and a similar opening 92 permits the insertion of member 88.

Figure 6:
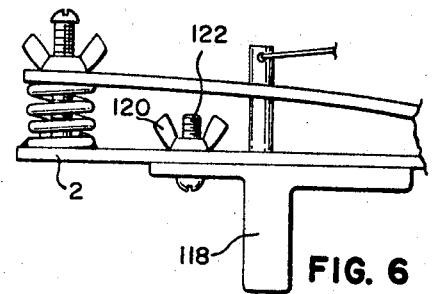
FIGURE 6 is a side view of a portion of the device attached to another mounting means.
Figure 5:
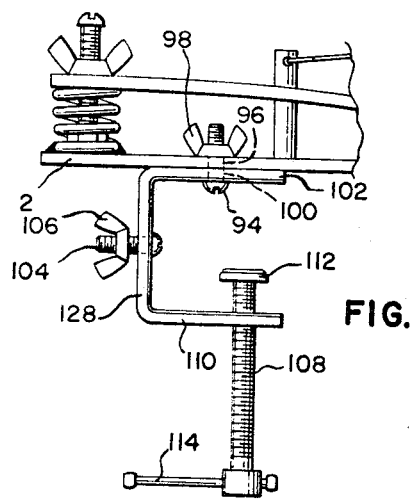
FIGURE 5 is a side view of a portion of the device connected to a mounting means.

FIGURES 5 and 6 show two different devices for mounting the holder. In FIGURE 5, the holder is mounted on a C-clamp by means of a threaded bolt 94 inserted through opening 96 in the base of the holder and held by wing nut 98. A similar opening 100 is formed in side 102 of the clamp. Threaded bolt 104 and wing nut 106 in side 128 of the clamp may also be used to mount the rod holder. Screw threaded member 108 in side 110 of the clamp moves head 112 against a part of a railing or part of a boat by means of turning lever 114.

FIGURE 6 is a ground stake having a ground engaging member 116 and manually engageable handle 118. A wing nut 120 and threaded bolt 122 secures the base of the rod holder to the ground engaging handle 118.

A knob or handle 124 may be provided to assist in pivoting the rod holder about the point 96 at which the base is pivotally attached to the boat or railing.

Figure 2:
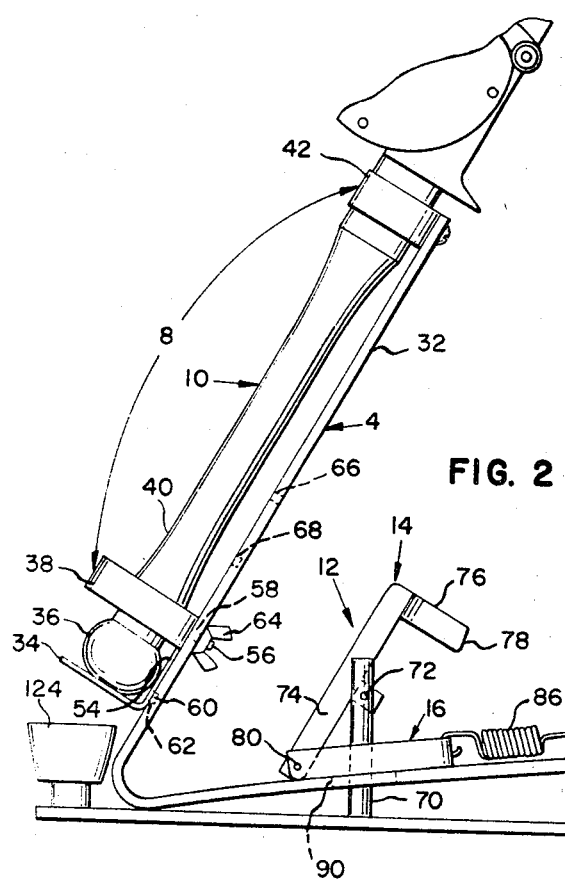
FIGURE 2 is another side elevation view of the device with the moving parts shown in still another position.

To cock the device, member 74 is rotated in a clockwise direction as shown in FIGURES 1 and 2 until the offset portion 126 of offset foot 76 comes in contact with spring 86. Impact member 16 swings upwardly as shown in the full lines in FIGURE 1.

When a fish takes the hook, the line pulls the pole downwardly placing a rotational force on the handle of the rod and causing the rod holder member to rotate in a clockwise direction as shown by arrow 6. The rod holder is raised by the tug of the fish to approximately the position shown in the phantom lines in FIGURE 1. Raising of the rod holder member strikes end 78 of the offset foot member and causes the member 74 to rotate in a counter-clockwise direction. At about the point where the rod holder member is shown in phantom line in FIGURE 1, the impact means 12 reaches an over-center position and the spring 86 pulls the yoke member 16 very rapidly to an over-center position and causes it to strike the rod holder member with an impact force thereby causing the rod member to rotate in a counter-clockwise direction as shown in arrow 18 in FIGURE 1. The impact means continues to rotate until the parts reach a position at rest as shown in FIGURE 2.

Although the rod holder member does not move a very great distance it must be remembered that the only movement needed at the hook is a little over one-quarter of an inch which is the length of an ordinary barb on a hook. The impact force sets the hook quickly and neatly and the short stroke of the rod holder member moves the hook in the fish's mounth only enough to hook it and not tear the fish's mouth. It has been found that the trigger mechanism is extremely sensitive and fast and a greater percentage of fish are hooked in the mouth rather than in the throat. Hooking the fish in the mouth improves the sport in playing the fish since most fish will not maneuver as much as desirable when hooked in the throat.

In fishing in calm waters without wind, very little clamping force is placed on spring 26 by wing nut 28. The rod holder pivots easily in this position. Where it is necessary to compensate for wind, currents or tides, it is a simple matter to tighten down on the wing nut 28 thereby making it more difficult to raise the rod holder off the base, therefore requiring greater force to move the rod holder to the tripping point. Since the force of the tide or current is assisting in the tripping of the device, actually no more force is required by the fish to trip the device when the holder is set for fast current conditions or still waters.

It should be noted that the impact means 12 is cradled safely between the legs of the V-shaped rod holder member to protect it from damage when stored in tackle boxes or if accidently dropped.

I claim:
1. A fishing rod holder and hook setting device comprising:
 (a) a base;
 (b) a V-shaped rod holder member having one end pivotally mounted for pivotal movement on said base in a first direction and including first means adapted for receiving a fishing pole;
 (c) an impact means mounted on said base including second means selectively engageable by said rod holder member upon a predetermined movement of said rod holder member in said first direction and induced by the pull of a fish and including striking means connected to said second means and movable against said rod holder member with impact force upon a predetermined movement of said second means induced by further movement of said rod holder member in said first direction and thereby rapidly moving said rod holder member in a second direction opposite to said first direction for setting a hook in the mouth of a fish;
 (d) a spring interposed between said base and said pivoted end; and
 (e) adjustable means clamping said pivoted end against said spring for selectively impeding the movement of said rod holder member in said first direction.
2. The fishing rod holder in claim 1 wherein:
 (a) said impact means includes a spring operatively connected to said striking means;
 (b) said second means includes an arm pivotally mounted on said base; and
 (c) said striking means includes a yoke pivotally connected at one end to an end of said arm and at the other end to said spring.

References Cited

UNITED STATES PATENTS

| | | | |
|---|---|---|---|
| 2,638,696 | 5/1953 | Derkovitz | 43—15 |
| 2,835,065 | 5/1958 | Schwartzkopf | 43—15 |
| 2,986,834 | 6/1961 | Irwin | 43—15 |

D. J. LEACH, *Assistant Examiner.*

SAMUEL KOREN, *Primary Examiner.*